(12) United States Patent
Hashimoto et al.

(10) Patent No.: US 12,503,139 B2
(45) Date of Patent: Dec. 23, 2025

(54) VEHICLE

(71) Applicant: TOYOTA JIDOSHA KABUSHIKI KAISHA, Toyota (JP)

(72) Inventors: Sho Hashimoto, Susono (JP); Satoshi Nakamura, Shizuoka-ken (JP); Tomoki Somiya, Okazaki (JP); Kazumasa Harada, Nagakute (JP); Hiroki Yabushita, Toyota (JP); Sei Miyazaki, Susono (JP); Yuki Nishikawa, Numazu (JP); Noriaki Hasegawa, Izunokuni (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/436,338

(22) Filed: Feb. 8, 2024

(65) Prior Publication Data

US 2024/0286646 A1    Aug. 29, 2024

(30) Foreign Application Priority Data

Feb. 28, 2023    (JP) .................................. 2023-029975

(51) Int. Cl.
*B60W 60/00*    (2020.01)
*B60W 50/02*    (2012.01)
*B60W 50/04*    (2006.01)

(52) U.S. Cl.
CPC .... *B60W 60/0016* (2020.02); *B60W 50/0205* (2013.01); *B60W 50/04* (2013.01); *B60W 2554/804* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 11,466,997 B1 * | 10/2022 | Williams | G08G 1/096716 |
| 11,466,998 B1 * | 10/2022 | Williams | G06Q 10/0635 |
| 11,565,716 B2 * | 1/2023 | Fairley | B60W 60/0011 |
| 12,027,053 B1 * | 7/2024 | Crossman | B60W 30/0956 |
| 12,139,174 B2 * | 11/2024 | Ando | B60W 30/182 |
| 2016/0016590 A1 * | 1/2016 | Fernandez Pozo | H04W 4/48 702/145 |
| 2016/0167653 A1 * | 6/2016 | Malone | B60W 10/18 701/23 |
| 2017/0123434 A1 * | 5/2017 | Urano | G08G 1/096791 |
| 2018/0299898 A1 * | 10/2018 | Luo | B60W 30/143 |

(Continued)

FOREIGN PATENT DOCUMENTS

| | | |
|---|---|---|
| JP | 2021-062780 A | 4/2021 |
| JP | 2021-123146 A | 8/2021 |

*Primary Examiner* — Jonathan M Dager
(74) *Attorney, Agent, or Firm* — SoraIP, Inc.

(57) ABSTRACT

The vehicle is configured to be able to communicate with an Autonomous Driving Kit configured to be detachable from the vehicle, and includes an interface unit that gives a control instruction related to autonomous driving control to each unit of the vehicle based on an instruction from Autonomous Driving Kit, and an active safety device that realizes a preventive safety function of the vehicle. The active safety device includes a performance evaluation unit that evaluates the driving performance of Autonomous Driving Kit on the basis of the property of the area in which the vehicle is traveling.

7 Claims, 3 Drawing Sheets

(56) References Cited

U.S. PATENT DOCUMENTS

| | | | |
|---|---|---|---|
| 2019/0141275 A1* | 5/2019 | Galluzzi | G08G 1/167 |
| 2019/0332106 A1* | 10/2019 | Belloni Mourao | B60W 40/08 |
| 2020/0242922 A1* | 7/2020 | Dulberg | G08G 1/166 |
| 2020/0271689 A1* | 8/2020 | Nichols | G01S 7/497 |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2021/0229697 A1* | 7/2021 | Lee | B60W 30/182 |
| 2021/0237722 A1* | 8/2021 | Suzuki | B60W 60/00 |
| 2021/0237765 A1* | 8/2021 | Ando | B60W 60/001 |
| 2021/0237766 A1* | 8/2021 | Suzuki | B60W 10/10 |
| 2021/0245806 A1 | 8/2021 | Suzuki et al. | |
| 2021/0286356 A1* | 9/2021 | Yang | G05D 1/0282 |
| 2022/0032905 A1* | 2/2022 | Lee | G05D 1/0088 |
| 2022/0169269 A1* | 6/2022 | Yang | G06V 40/103 |
| 2023/0406357 A1* | 12/2023 | Misawa | B60W 50/14 |
| 2024/0174263 A1* | 5/2024 | Hashimoto | B60W 50/029 |
| 2024/0182022 A1* | 6/2024 | Hashimoto | B60W 30/0956 |
| 2024/0190472 A1* | 6/2024 | Futagami | B60W 60/0018 |
| 2024/0286605 A1* | 8/2024 | Hashimoto | B60W 60/0015 |
| 2024/0286645 A1* | 8/2024 | Hashimoto | B60W 60/0015 |
| 2024/0286648 A1* | 8/2024 | Hashimoto | G06V 20/597 |
| 2024/0288884 A1* | 8/2024 | Hashimoto | B60W 60/00186 |

\* cited by examiner

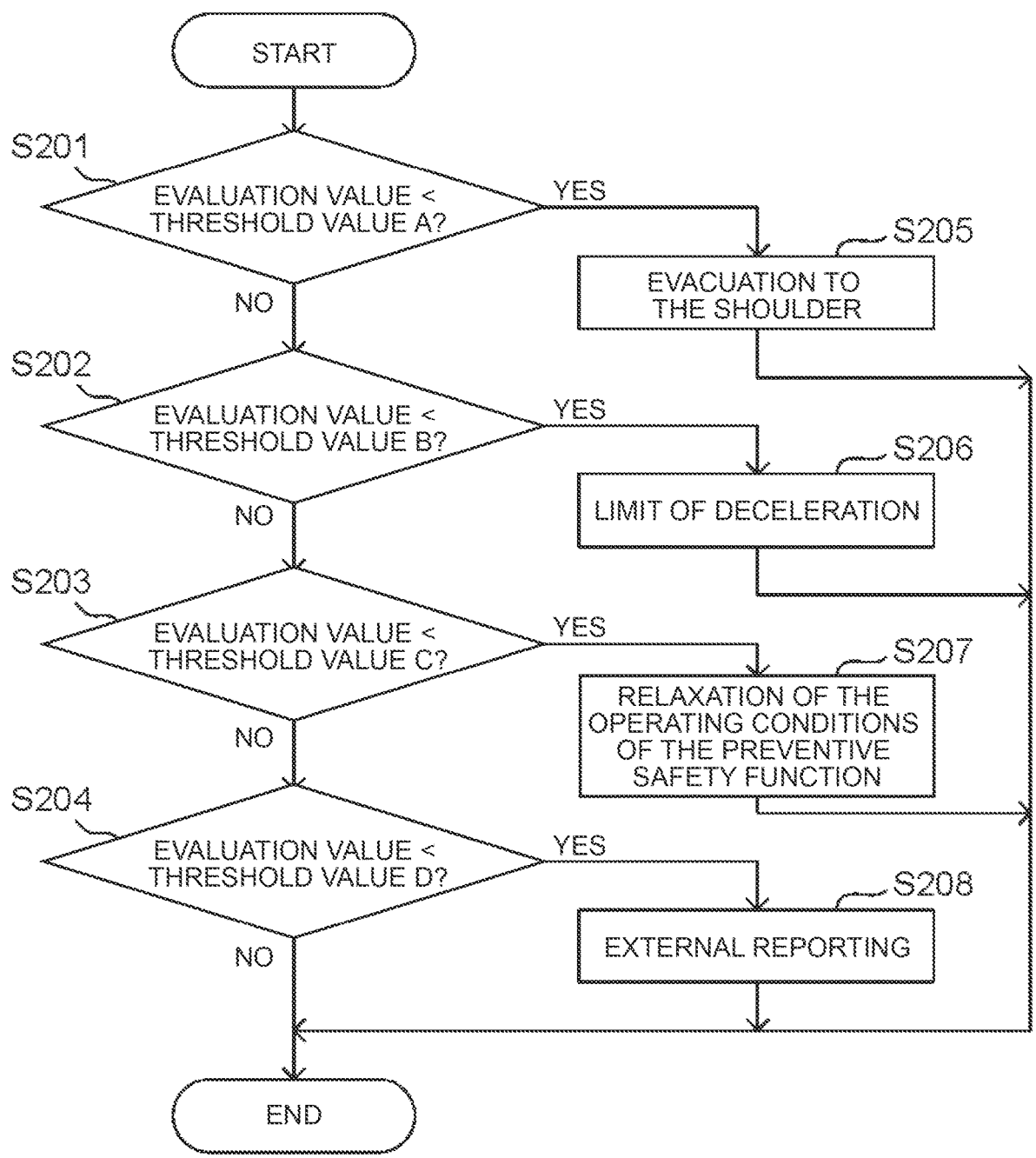

VEHICLE

CROSS-REFERENCE TO RELATED APPLICATION

This application claims priority to Japanese Patent Application No. 2023-029975 filed on Feb. 28, 2023, incorporated herein by reference in its entirety.

BACKGROUND

1. Technical Field

The present disclosure relates to the technical field of vehicles.

2. Description of Related Art

As a vehicle of this type, for example, a vehicle has been proposed that is autonomously driven by control instructions being output to functional units of the vehicle according to instructions from an autonomous driving kit attachable to and detachable from the vehicle (Japanese Unexamined Patent Application Publication No. 2021-123146 (JP 2021-123146 A)). A vehicle control system has also been proposed that includes a first unit that generates a target trajectory based on a vehicle travel plan, and a second unit that performs vehicle travel control so that the vehicle follows the target trajectory. The second unit of the vehicle control system intervenes in a travel controlled variable so as to prevent a collision between the vehicle and an obstacle (see Japanese Unexamined Patent Application Publication No. 2021-062780 (JP 2021-062780 A)).

SUMMARY

Vehicles that are autonomously driven by an autonomous driving kit have a technical problem in that autonomous driving cannot be continued if an abnormality occurs in the functions of the autonomous driving kit.

The present disclosure has been made in view of the above problem, and an object the present disclosure is to provide a vehicle that can detect a sign of abnormality in an autonomous driving kit.

A vehicle according to an aspect of the present disclosure includes: an interface unit that is configured to be able to communicate with an autonomous driving kit configured to be attachable to and detachable from the vehicle and that gives a control instruction related to autonomous driving control to each part of the vehicle based on an instruction from the autonomous driving kit; and an active safety device that implements an active safety function of the vehicle. The active safety device includes a performance evaluation unit that evaluates driving performance of the autonomous driving kit based on an attribute of a region in which the vehicle travels.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flow chart illustrating another exemplary operation of the active safety device according to the embodiment.

DETAILED DESCRIPTION OF EMBODIMENTS

An embodiment of a vehicle will be described with reference to FIGS. 1 to 5.

Configuration of the Vehicle

Figure 1:
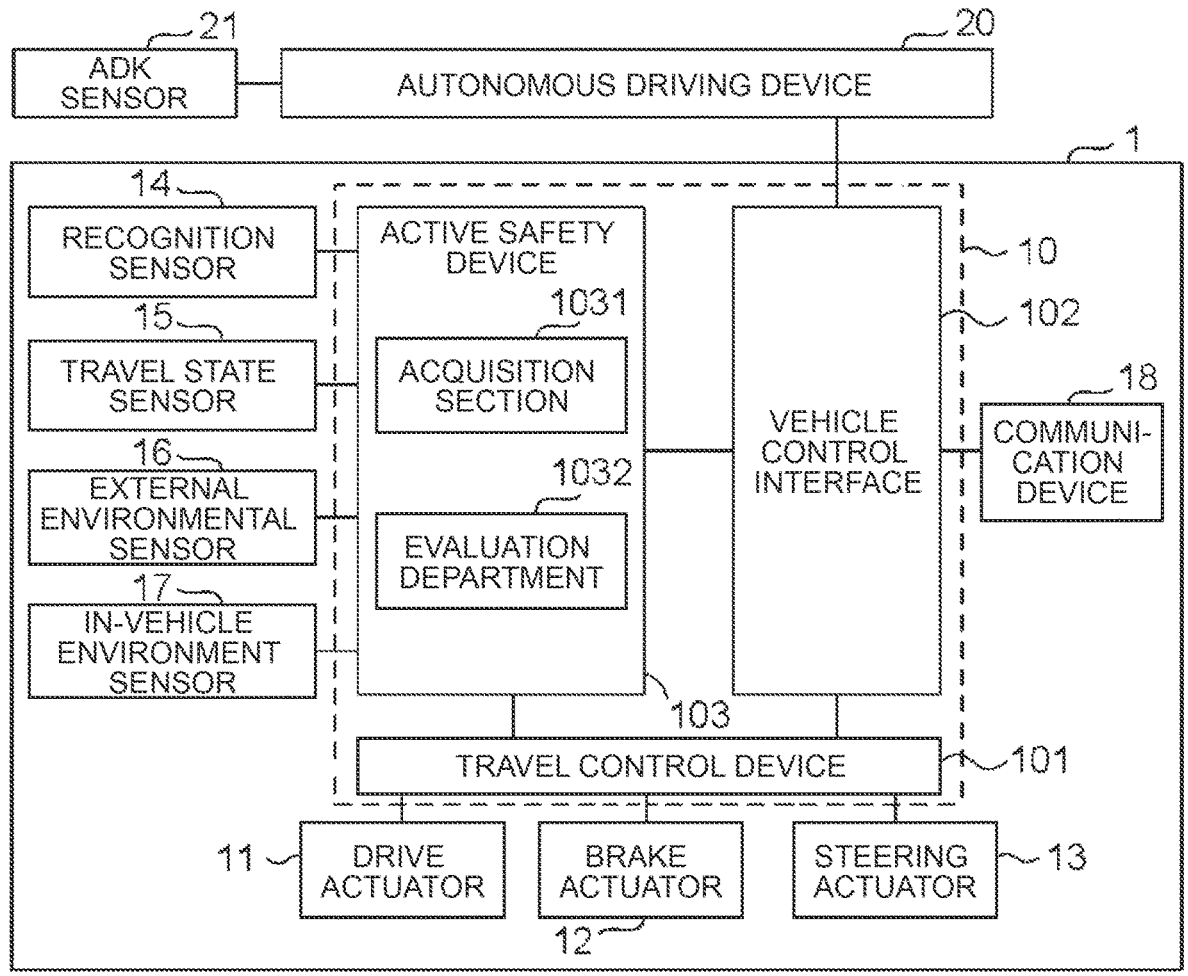
FIG. 1 is a block diagram illustrating a configuration of a vehicle according to an embodiment.

In FIG. 1, the vehicle 1 includes a travel control system 10, a drive actuator 11, a brake actuator 12, a steering actuator 13, a recognition sensor 14, a travel state sensor 15, an external environment sensor 16, an in-vehicle environment sensor 17, and a communication device 18. Note that the vehicle 1 may not include the external environment sensor 16 and the in-vehicle environment sensor 17.

An autonomous driving device 20 is connected to the vehicle 1. The autonomous driving device 20 is a device that is detachable from the vehicle 1 and is independent of the vehicle 1. The autonomous driving device 20 may be connected to the travel control system 10 by a detachable connector. Here, the travel control system 10 is a system specific to the vehicle 1. The travel control system 10 is provided by an automobile manufacturer together with the vehicle 1. On the other hand, the autonomous driving device 20 is often designed and developed by a subject different from the travel control system 10. The autonomous driving device 20 may be referred to as an Autonomous Driving Kit (ADK).

The travel control system 10 and the autonomous driving device 20 may constitute an autonomous driving system for autonomously driving the vehicle 1. Note that "autonomous driving" may mean autonomous driving of level 3 or higher in the level definition of Society of Automotive Engineers (SAE), for example.

The travel control system 10 may include one or more processors and a memory coupled to the processors. The travel control system 10 may be electrically coupled to an in-vehicle actuator (e.g., drive actuator 11, brake actuator 12, and steering actuator 13), an in-vehicle sensor (e.g., recognition sensor 14, travel condition sensor 15, external environmental sensor 16, and in-vehicle environmental sensor 17), and a communication device 18 by an in-vehicle network (e.g., Controller Area Network (CAN)).

The drive actuator 11 is an actuator for accelerating the vehicle 1. The brake actuator 12 is an actuator for decelerating or stopping the vehicle 1. The steering actuator 13 is an actuator for steering the vehicle 1.

The recognition sensor 14 may include at least one of a camera (i.e., an image sensor) and a radar sensor (e.g., a millimeter wave radar or a laser radar). The recognition sensor 14 is used for detecting an object (for example, a vehicle, a pedestrian, a bicycle, or a falling object) existing in the vicinity of the vehicle 1 and measuring a relative position and a relative speed of the detected object with respect to the vehicle 1. The recognition sensor 14 may include a position detection device that detects the position of the vehicle 1. The position detecting device may be a Global Positioning System (GPS) sensor.

The travel state sensor 15 may include at least one of a speed sensor, an acceleration sensor, and a yaw rate sensor. The travel state sensor 15 is used for measuring at least one of a physical quantity (for example, speed, acceleration, yaw rate) and a parameter indicating a traveling state of the vehicle 1. The external environment sensor 16 is a sensor that acquires information about the external environment of the vehicle 1. The external environment sensor 16 may include at least one of a raindrop sensor and a temperature sensor. The in-vehicle environment sensor 17 is a sensor that acquires information related to the in-vehicle environment of the vehicle 1. The in-vehicle environment sensor 17 may include at least one of a camera, a temperature sensor, and a pressure sensor.

The communication device 18 is a device for the vehicle 1 to perform data communication with the outside. The communication device 18 may be connected to an external communication network by wireless communication. Therefore, the vehicle 1 may be a so-called connected car.

The travel control system 10 includes a travel control device 101, a vehicle control interface 102, and an active safety device 103 as logically implemented functional blocks or as physically implemented processing circuits. The travel control device 101, the vehicle control interface 102, and the active safety device 103 will be described later.

The autonomous driving device 20 is electrically coupled to ADK sensor 21. ADK sensor 21 may be integrally formed with the autonomous driving device 20. ADK sensor 21 may be detachably attached to the autonomous driving device 20 or the vehicle 1. ADK sensor 21 is a sensor for acquiring data required when the autonomous driving device 20 drives the vehicle 1. For example, ADK sensor 21 may include a camera, a radar sensor, and a GPS sensor.

The autonomous driving device 20 may have a function of formulating a travel plan. The autonomous driving device 20 may calculate a target trajectory for causing the vehicle 1 to travel on the basis of the planned travel plan and the data acquired by ADK sensor 21. For example, the target trajectory may include a point sequence indicating a plurality of target positions of the vehicle 1 and at least one of the target speed and the target acceleration at each of the plurality of target positions. The autonomous driving device 20 transmits the calculated target trajectory to the travel control system 10. The autonomous driving device 20 may repeatedly calculate the target trajectory and transmit the calculated target trajectory to the travel control system 10 at a predetermined cycle.

The target trajectory transmitted from the autonomous driving device 20 is input to the travel control device 101 via the vehicle control interface 102 of the travel control system 10. For example, the travel control device 101 calculates at least one of a drive control amount to be instructed to the drive actuator 11, a braking control amount to be instructed to the brake actuator 12, and a steering control amount to be instructed to the steering actuator 13 based on the target trajectory and the measurement result of the travel state sensor 15.

The active safety device 103 is a device that performs an intervention to the travel control device 101 so as to prevent or avoid a collision between the vehicle 1 and an object. Examples of the control for preventing or avoiding a collision between the vehicle 1 and the object include control for preventing the vehicle 1 from deviating from the lane (for example, lane departure prevention control, lane maintenance support control), control for keeping the inter-vehicle distance between the vehicle 1 and the preceding vehicle constant (for example, inter-vehicle distance control), and control for automatically applying a braking force to the vehicle 1 when there is a high possibility of a collision between the vehicle 1 and the object (for example, collision damage reduction brake).

As an intervention method of the active safety device 103 to the travel control device 101, there is a method in which the active safety device 103 provides an intervention control amount to the travel control device 101. In this case, the intervention control amount may include at least one of a drive control amount, a braking control amount, and a steering control amount. When the intervention control amount is given to the travel control device 101 from the active safety device 103, the travel control device 101 prioritizes the intervention control amount over the control amount calculated from the target trajectory (specifically, at least one of the drive control amount, the braking control amount, and the steering control amount). The travel control device 101 controls at least one of the drive actuator 11, the brake actuator 12, and the steering actuator 13 according to the intervention control amount.

The autonomous driving device 20 detects an object existing around the vehicle 1 based on the data acquired by ADK sensor 21. Then, the autonomous driving device 20 calculates a target trajectory so that the vehicle 1 does not collide with the detected object. Therefore, theoretically, if the travel control device 101 calculates the control amount (specifically, at least one of the drive control amount, the braking control amount, and the steering control amount) according to the target trajectory calculated by the autonomous driving device 20, the collision between the vehicle 1 and the object does not occur. However, some abnormality may occur in the autonomous driving device 20, which may cause the driving performance of the autonomous driving device 20 to deteriorate constantly or temporarily. Therefore, the active safety device 103 may be operated as a last means of preventing or avoiding a collision between the vehicle 1 and an object.

From the viewpoint of preventive safety, the active safety device 103 is provided with a function as a performance evaluation device for evaluating the operation performance of the autonomous driving device 20. The active safety device 103 may evaluate the driving performance of the autonomous driving device 20 based on information obtained from at least one of the recognition sensor 14 and the travel state sensor 15. The active safety device 103 may evaluate the driving performance of the autonomous driving device 20 on the basis of information obtained from at least one of the recognition sensor 14, the travel state sensor 15, the external environment sensor 16, and the in-vehicle environment sensor 17. Details of the evaluation of the operation performance of the autonomous driving device 20 will be described later. The active safety device 103 may perform correspondence according to the evaluation result of the driving performance of the autonomous driving device 20.

Figure 2:
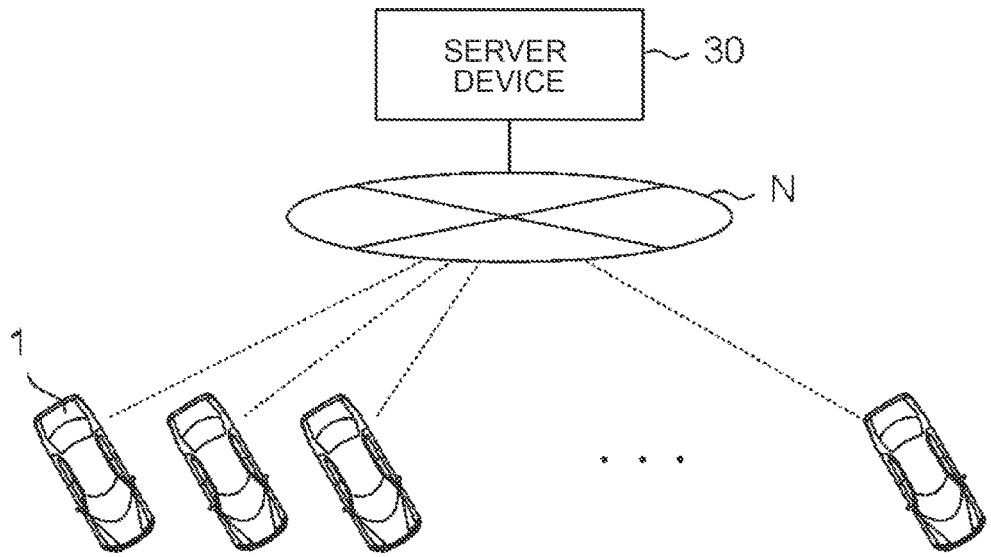
FIG. 2 is a conceptual diagram illustrating a relationship between a vehicle and a server device according to the embodiment.

As illustrated in FIG. 2, a plurality of vehicles including the vehicle 1 are configured to be able to communicate with the server device 30 via the network N. Each of the plurality of vehicles including the vehicle 1 transmits travel data to the server device 30. For example, the travel data includes speed, position, and time. The traveling data may further include an acceleration, an operation frequency of the collision damage mitigation brake, an execution frequency of the lane deviation prevention control, and the like.

Figure 3:
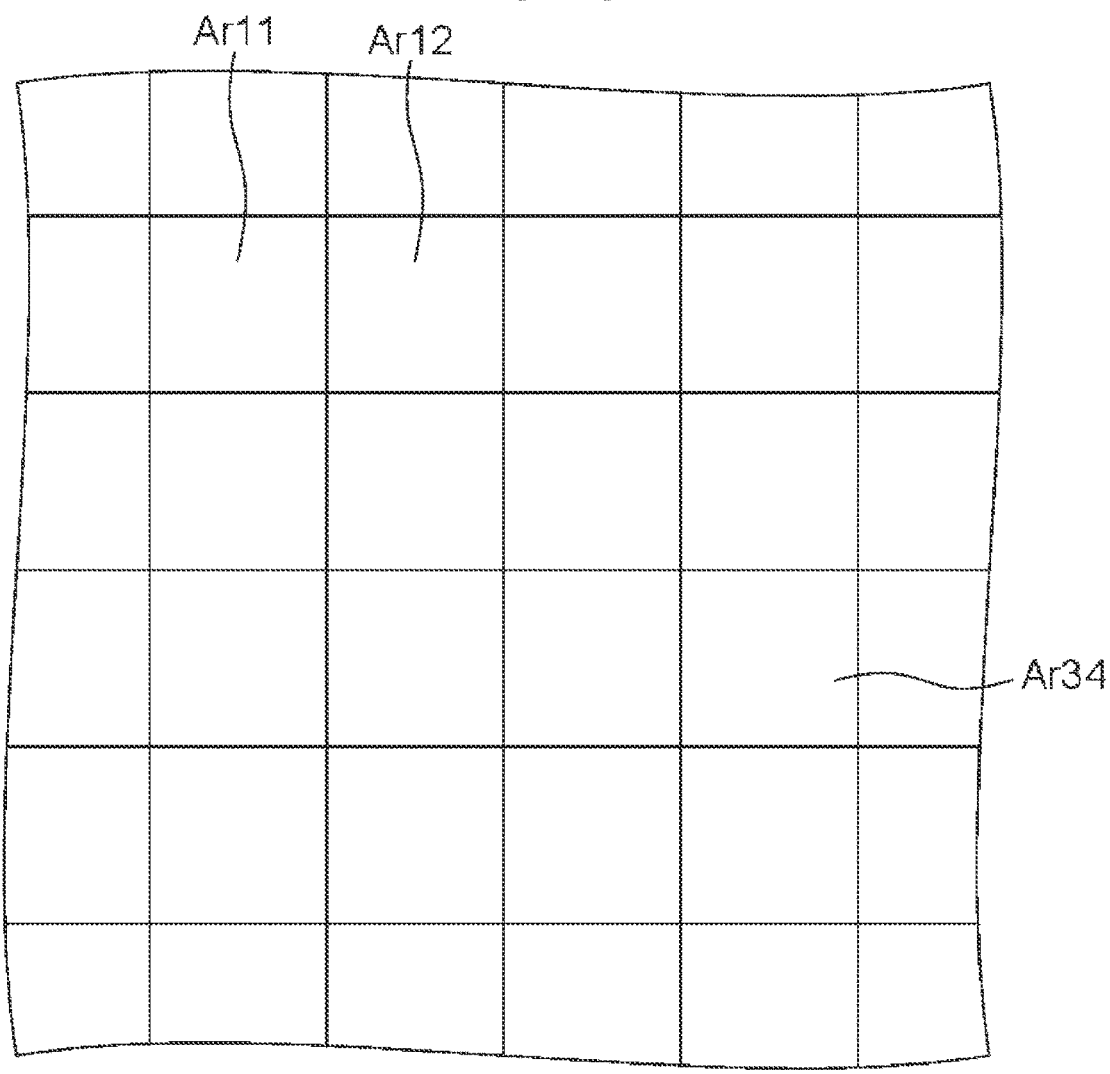
FIG. 3 is a diagram illustrating an example of a plurality of regions set on a map.

The server device 30 accumulates a plurality of travel data transmitted from a plurality of vehicles. The server device 30 may associate one region among a plurality of regions set in advance on the map with each of the plurality of travel data. Note that the plurality of regions set in advance on the map may be mesh-like regions (so-called regional meshes) as shown in FIG. 3. The plurality of regions are not limited to mesh-shaped regions, and may be regions corresponding to each of the plurality of roads (for example, regions corresponding to expressways, regions corresponding to trunk roads, and the like). Note that the server device 30 may classify a plurality of travel data for each vehicle type and accumulate the data.

The server device 30 acquires restriction information (for example, a speed limit, a passage prohibition restriction, and the like) in each of the plurality of regions based on, for example, the map information. Note that the traffic prohibition may include a restriction that prohibits the passage of the vehicle at a specific time (for example, a school zone) and a restriction that prohibits the passage of a specific vehicle type (for example, prohibition of the passage of a large vehicle).

The server device 30 may set the attribute of the one area based on at least one of the plurality of travel data associated with the one area among the plurality of areas and the restriction information. "Based on a plurality of travel data" may mean, for example, based on a distribution of a plurality of speeds indicated by each of the plurality of travel data. "Based on a plurality of traveling data" may mean, for example, based on a standard traveling mode of a vehicle obtained from a plurality of traveling data. It should be noted that the normal running mode of the vehicle may be represented by, for example, a mean velocity of $V_1$ km/h. The normal traveling mode of the vehicle may be represented by, for example, the median velocity of $V_2$ km/h. Note that a standard traveling mode of the vehicle may be determined for each vehicle type.

The attribute of one of the plurality of regions may be represented by an index indicating the roughness of travel of the vehicle in the one region. The indication of the roughness of travel may include, for example, "rough," "normal," and "good." For example, in one region, when the percentage of vehicles traveling at a speed 10 km/h lower than or equal to the legal speed is 80% or more, the server device 30 may set the property of the one region to "rough". For example, in one region, when the percentage of vehicles traveling at a speed 10 km/h lower than or equal to the legal speed is 80% or more, the server device 30 may set the property of the one region to "good". For example, in one region, when the ratio of vehicles traveling at a speed lower than the legal speed by 10 km/h is less than 80% and the ratio of vehicles traveling at a speed lower than the legal speed by 10 km/h is less than 80%, the server device 30 may set the property of the one region to "normal". For example, in a case where a part of a road included in one region is regulated to prohibit the passage of a vehicle in a specific time period, the server device 30 may set the attribute of the one region in the specific time period to "good". That is, the attributes of one region may vary with time. Note that the attribute of the area is not limited to the index indicating the roughness of the travel, and may be represented by an index indicating the characteristics of the area where the road is provided, such as "urban area" and "suburban area".

Each of the plurality of vehicles including the vehicle 1 may sequentially transmit the traveling data to the server device 30. The server device 30 may periodically update the attributes of at least one region of the plurality of regions based on the plurality of travel data transmitted from the plurality of vehicles. The server device 30 provides information indicating the attributes of each of the plurality of regions set in advance on the map to each of the plurality of vehicles including the vehicle 1.

Performance Evaluation Methods

A method of evaluating the operation performance of the autonomous driving device 20 performed by the active safety device 103 will be described. The acquisition unit 1031 of the active safety device 103 acquires, from the server device 30, information indicating attributes of at least one of a plurality of regions set in advance on the map via the communication device 18. The at least one area includes a position where the vehicle 1 is currently traveling.

The evaluation unit 1032 of the active safety device 103 sets a threshold value for evaluating the driving performance of the autonomous driving device 20 in a region including a position where the vehicle 1 is currently traveling, based on the information indicating the attribute of the at least one region. When the attribute is "good", the evaluation unit 1032 may set the threshold value to "a speed 10 km/h lower than the legal speed". If the attribute is "normal", the evaluation unit 1032 may set the threshold value to "a speed 5 km/h lower than the legal speed". When the attribute is "rough", the evaluation unit 1032 may set the threshold value to "legal speed".

Note that the evaluation unit 1032 may set a plurality of types of threshold values for one attribute. For example, when the attribute is "good", the evaluation unit 1032 may set, as the threshold value, a "speed 10 km/h lower than the legal speed", "acceleration is 0.3 g", "execution frequency of the lane deviation prevention control is/km 0.02 times", and "execution frequency of the collision damage reduction braking is/km 0.01 times".

The evaluation unit 1032 may specify the current traveling mode of the vehicle 1 based on information obtained from the travel state sensor 15. The evaluation unit 1032 may evaluate the driving performance of the autonomous driving device 20 by comparing the traveling mode of the vehicle 1 with a threshold value relating to an area including a position where the vehicle 1 is currently traveling.

Figure 4:
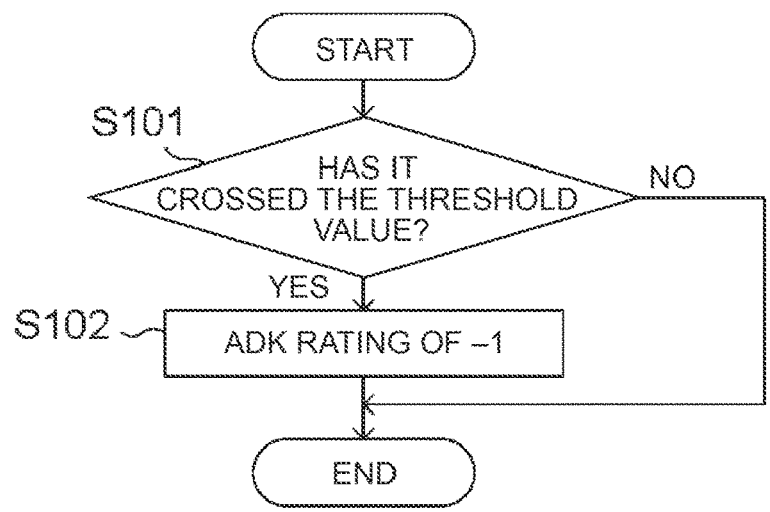
FIG. 4 is a flow chart illustrating an exemplary operation of the active safety device according to the embodiment.

Specifically, the evaluation unit 1032 may evaluate the operation performance of the autonomous driving device 20 by the operation illustrated by the flowchart of FIG. 4. Here, it is assumed that the evaluation of the operation performance of the autonomous driving device 20 is expressed by a numerical value (that is, an evaluation value).

In the flow chart of FIG. 4, the evaluation unit 1032 determines whether or not the traveling mode of the vehicle 1 straddles the threshold values (S101). For example, it is assumed that the vehicle 1 is traveling in the area Ar11 of FIG. 3, and the area Ar11 is "good". Here, the threshold values for the area Ar11 may be "a rate 10 km/h lower than the legal rate". The "rate 10 km/h below the legal rate" may be, for example, 50 km/h. For example, when the speed as an exemplary traveling mode of the vehicle 1 is 51 km/h, the evaluation unit 1032 may determine that the traveling mode of the vehicle 1 straddles the threshold value in S101 process.

For example, it is assumed that the vehicle 1 is traveling in the area Ar34 of FIG. 3 and the area Ar34 is "rough". Here, the threshold values for the area Ar34 may be "legal rates". The "statutory rate" may be, for example, 60 km/h. For example, when the speed as an exemplary traveling mode of the vehicle 1 is 51 km/h, the evaluation unit 1032 may determine that the traveling mode of the vehicle 1 does not straddle the threshold value in S101 process. That is, "straddling the threshold value" may mean "greater than the threshold value".

When it is determined in the determination of S101 that the evaluation is over the threshold values (S101: Yes), the evaluation unit 1032 decreases the evaluation value related to the autonomous driving device 20 by 1 (S102). Thereafter, S101 process may be performed after a first predetermined period of time (e.g., tens of milliseconds to hundreds of milliseconds) has elapsed. That is, the operation illustrated by the flowchart of FIG. 4 may be repeatedly performed at a cycle corresponding to the first predetermined time.

It should be noted that the change amount ("−1" in FIG. 4) of the evaluation value in S102 process may be changed according to a plurality of parameters indicating the traveling mode of the vehicle 1 (for example, the speed, the acceleration, the execution frequency of the lane deviation prevention control, the execution frequency of the collision damage reduction brake, and the like). For example, when the speed as an example of the traveling mode straddles the threshold value, the evaluation unit 1032 may reduce the evaluation value by 1. For example, when the degree of deviation of the execution frequency of the lane deviation prevention control as another example of the traveling mode straddles the threshold value, the evaluation unit 1032 may reduce the evaluation value by 5.

In S101 determination, when it is determined that the threshold value is not crossed (S101: No), the operation illustrated by the flow chart of FIG. 4 is ended. Thereafter, S101 process may be executed after the first predetermined period has elapsed. When it is determined in S101 determination that the evaluation value does not straddle the threshold value (S101: No), the evaluation unit 1032 may increase the evaluation value by 0.1 on condition that the evaluation value related to the autonomous driving device 20 is smaller than the initial value.

Alternatively, when the evaluation value related to the autonomous driving device 20 is smaller than the initial value, the evaluation unit 1032 may increase the evaluation value related to the autonomous driving device 20 by 0.1 after it is determined in S101 determination that the evaluation value has straddled the threshold value, on condition that it is not determined in S101 determination that the evaluation value has not straddled the threshold value within the second predetermined time (for example, 5 seconds). The evaluation unit 1032 may set (i.e., reset) an evaluation value related to the autonomous driving device 20 to an initial value when the vehicle 1 is in an ignition OFF condition. Further, when the position at which the vehicle 1 is traveling is switched from one area (for example, the area Ar11 in FIG. 3) to another area (for example, the area Ar12 in FIG. 3), the evaluation unit 1032 may set (i.e., reset) the evaluation value related to the autonomous driving device 20 to the initial value.

The active safety device 103 performs the operations illustrated by the flowchart of FIG. 5 in parallel with the operations illustrated by the flowchart of FIG. 4. In FIG. 5, the threshold value A is smaller than the threshold value B, the threshold value B is smaller than the threshold value C, and the threshold value C is smaller than the threshold value D (that is, the threshold value A<the threshold value B<the threshold value C<the threshold value D).

In FIG. 5, the active safety device 103 determines whether or not the evaluation value of the autonomous driving device 20 is smaller than the threshold value A (S201). In S201 process, when it is determined that the evaluation value related to the autonomous driving device 20 is smaller than the threshold value A (S201: Yes), the active safety device 103 intervenes with the travel control device 101 so that the vehicle 1 is retracted to the road shoulder (S205).

In S201 process, when it is determined that the evaluation value related to the autonomous driving device 20 is equal to or greater than the threshold value A (S201: No), the active safety device 103 determines whether the evaluation value related to the autonomous driving device 20 is smaller than the threshold value B (S202). In S202 process, when it is determined that the evaluation value related to the autonomous driving device 20 is smaller than the threshold value B (S202: Yes), the active safety device 103 intervenes with respect to the travel control device 101 so that the speed of the vehicle 1 is limited (for example, so that the speed of the vehicle 1 does not exceed the predetermined speed) (S206).

In S202 process, when it is determined that the evaluation value related to the autonomous driving device 20 is equal to or greater than the threshold value B (S202: No), the active safety device 103 determines whether the evaluation value related to the autonomous driving device 20 is smaller than the threshold value C (S203). In S203 process, when it is determined that the evaluation value related to the autonomous driving device 20 is smaller than the threshold value C (S203: Yes), the active safety device 103 relaxes the operation condition of the preventive safety function (in other words, changes the operation condition so that the preventive safety function becomes easy to operate) (S207).

In S203 process, when it is determined that the evaluation value related to the autonomous driving device 20 is equal to or greater than the threshold value C (S203: Yes), the active safety device 103 determines whether the evaluation value related to the autonomous driving device 20 is smaller than the threshold value D (S204). In S204 process, when it is determined that the evaluation value related to the autonomous driving device 20 is smaller than the threshold value D (S204: Yes), the active safety device 103 notifies the outside of the vehicle 1 via the vehicle control interface 102 and the communication device 18 (S208).

In S208 process, the active safety device 103 may notify the Helpnet. The help net means a management center for an emergency response operated by at least one of a business operator providing the vehicle 1 and a business operator performing maintenance of the vehicle 1. As a consequence of S208 process, an operator of the help-net may take an urgent action on the vehicle 1. Alternatively, S208 process may result in an automated response of the Helpnet to provide an urgent response to the vehicle 1. For example, as an emergency response related to the vehicle 1, a vehicle stop instruction may be transmitted from the help net to the vehicle 1.

In S204 process, when it is determined that the evaluation value of the autonomous driving device 20 is equal to or larger than the threshold value D (S204: No), the operation illustrated by the flow chart of FIG. 5 is ended. Thereafter, a S201 process may be performed.

Technical Effect

When the vehicle 1 is traveling in accordance with the target trajectory calculated by the autonomous driving device 20, when the traveling mode of the vehicle 1 straddles the threshold values determined in accordance with the attributes of the area (for example, area Ar11, etc.) in which the vehicle 1 is traveling, it can be interpreted that the traveling mode of the vehicle 1 is not suitable for the environment in which the vehicle 1 is placed. In this case, it can be said that the autonomous driving device 20 is unable to calculate a target trajectory suitable for the environment in which the vehicle 1 is placed.

The active safety device 103 reduces the evaluation value of the autonomous driving device 20 when the traveling mode of the vehicle 1 straddles the threshold value. Therefore, the start of the decrease in the evaluation value can be interpreted as a sign of an abnormality occurring in the autonomous driving device 20. Therefore, it can be said that the vehicle 1 including the active safety device 103 can detect a sign of abnormality of the autonomous driving device 20.

In addition, when the evaluation value related to the autonomous driving device 20 is decreased by a predetermined value or more (for example, when the evaluation value is lower than at least one of the threshold values A, B, C, and D in the flowchart of FIG. 5), the active safety device 103 performs an intervention with respect to the travel control device 101. Here, when the evaluation value of the autonomous driving device 20 decreases by a predetermined value or more, there is a high possibility that an abnormality has occurred in the autonomous driving device 20. In this case, the safety of the vehicle 1 can be ensured by the active safety device 103 intervening with respect to the travel control device 101.

Aspects of the disclosure derived from the embodiment described above will be described below.

A vehicle according to an aspect of the present disclosure is configured to be capable of communicating with an Autonomous Driving Kit configured to be attachable to and detachable from a vehicle, and includes an interface unit that provides a control instruction related to autonomous driving control to each unit of the vehicle based on an instruction from Autonomous Driving Kit, and an active safety device that realizes a preventive safety function of the vehicle, wherein the active safety device includes a performance evaluation unit that evaluates driving performance of Autonomous Driving Kit based on a property of an area in which the vehicle is traveling.

In the above-described embodiment, the "autonomous driving device 20" corresponds to an example of "Autonomous Driving Kit", the "vehicle control interface 102" corresponds to an example of "interface unit", and the "evaluation unit 1032" corresponds to an example of "performance evaluation unit".

The attribute may be represented by an index indicating the roughness of travel of the vehicle in the area. The attribute may be determined based on travel data of each of a plurality of vehicles traveling in the area.

The performance evaluation unit may evaluate the driving performance of Autonomous Driving Kit on the basis of a determination of whether or not a parameter relating to the traveling of the vehicle straddles a threshold value determined according to the attribute. In the above-described embodiment, at least one of the "speed", the "acceleration", the "operating frequency of the collision damage reduction brake" and the "execution frequency of the lane deviation prevention control" corresponds to an example of the "parameter related to the traveling".

The present disclosure is not limited to the above-described embodiments, and can be modified as appropriate within the scope and spirit of the disclosure that can be read from the claims and the entire specification, and a vehicle with such a modification is also included in the technical scope of the present disclosure.

What is claimed is:

1. A vehicle comprising a processor configured to:
communicate with an autonomous driving kit configured to be attachable to and detachable from the vehicle;
perform autonomous driving for the vehicle based on an instruction from the autonomous driving kit;
implement an active safety function of the vehicle;
evaluate driving performance of the autonomous driving kit based on an attribute of a region in which the vehicle travels;
determine whether a parameter related to traveling of the vehicle exceeds a first threshold value set in accordance with the attribute, wherein the parameter is at least one of a speed of the vehicle, an acceleration of the vehicle, an execution frequency of lane deviation prevention control, and an execution frequency of collision damage reduction brake;
evaluate the driving performance of the autonomous driving kit based on a result of the determination of whether the parameter related to the traveling of the vehicle exceeds the first threshold value; and
acquire travel data of each of a plurality of vehicles traveling in the region from the vehicles, the travel data including speed of each of the vehicles, wherein
the attribute is represented by an index indicating roughness of traveling of the vehicles in the region and is set based on the travel data, the index including a first index and a second index,
the first index indicates that a percentage of the vehicles traveling at a speed 10 km/h lower than a legal speed or lower is 80% or more, and
the second index indicates that the percentage is less than 80%.

2. The vehicle according to claim 1, wherein:
the parameter is the speed of the vehicle;
the first threshold value is a first predetermined speed; and
the processor is further configured to
calculate an evaluation value based on the result of the determination of whether the parameter related to the traveling of the vehicle exceeds the first threshold value,
evaluate the driving performance based on the evaluation value, and
reduce the evaluation value in a case where speed of the vehicle exceeds the first threshold value.

3. The vehicle according to claim 1, wherein the processor is further configured to determine whether the speed of the vehicle exceeds the first threshold value again after a predetermined period of time in a case where the processor determines that the speed of the vehicle exceeds the first threshold value.

4. The vehicle according to claim 2, wherein:
the processor is further configured to
determine whether the evaluation value is smaller than a second threshold value,
direct the vehicle to move to a road shoulder in a case where the processor determines that the evaluation value is smaller than the second threshold value,
determine whether the evaluation value is smaller than a third threshold value in a case where the processor determines that the evaluation value is equal to or greater than the second threshold value,
limit the speed of the vehicle to be equal to or less than a second predetermined speed in a case where the processor determines that the evaluation value is smaller than the third threshold value,
determine whether the evaluation value is smaller than a fourth threshold value in a case where the processor determines that the evaluation value is equal to or greater than the third threshold value, change an operation condition of the active safety function in a case where the processor determines that the evaluation value is smaller than the fourth threshold value, determine whether the evaluation value is smaller than a fifth threshold value in a case where the processor determines that the evaluation value is equal to or greater than the fourth threshold value, and notify a management center in a case where the processor determines that the evaluation value is smaller than the fifth threshold value; and the second threshold value is smaller than the third threshold value, the third threshold value is smaller than the fourth threshold value, and the fourth threshold value is smaller than the fifth threshold value.

5. The vehicle according to claim 4, wherein the management center:

responds to a notification from the processor, the management center being operated by at least one of a business operator that provides the vehicle and a business operator that performs maintenance of the vehicle; and includes a system configured to respond automatically to the vehicle.

6. The vehicle according to claim 5, wherein the system is further configured to:

receive information that the processor notifies to the management center; and transmit an instruction to stop the vehicle in a case where the system receives the information.

7. The vehicle according to claim 1, wherein:

the processor is further configured to determine whether a possibility of a collision between the vehicle and an object is higher than a sixth threshold value; and the active safety function is at least one of functions that the processor controls the vehicle to prevent the vehicle from deviating from a lane, controls the vehicle to keep a constant distance between the vehicle and a preceding vehicle, and applies a braking force to the vehicle in a case where the processor determines that the possibility of the collision between the vehicle and the object is higher than the sixth threshold value.

* * * * *